(12) United States Patent
Ma et al.

(10) Patent No.: US 11,971,796 B2
(45) Date of Patent: Apr. 30, 2024

(54) GOAL SEEK ANALYSIS BASED ON STATUS MODELS

(71) Applicant: International Business Machines Corporation, Armonk, NY (US)

(72) Inventors: Xiao Ming Ma, Xi'an (CN); Si Er Han, Xi'an (CN); Lei Gao, Xian (CN); A Peng Zhang, Xian (CN); Chun Lei Xu, Xian (CN); Rui Wang, Xian (CN); Jing James Xu, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 306 days.

(21) Appl. No.: 17/323,222

(22) Filed: May 18, 2021

(65) Prior Publication Data
US 2022/0374325 A1 Nov. 24, 2022

(51) Int. Cl.
*G06F 11/30* (2006.01)
*G06N 20/00* (2019.01)

(52) U.S. Cl.
CPC ...... *G06F 11/3055* (2013.01); *G06F 11/3072* (2013.01); *G06N 20/00* (2019.01)

(58) Field of Classification Search
CPC . G06F 11/3055; G06F 11/3072; G06N 20/00; G06Q 10/067; G06Q 30/0201
See application file for complete search history.

(56) References Cited

U.S. PATENT DOCUMENTS

| | | | |
|---|---|---|---|
| 7,788,200 B2 | 8/2010 | Crivat | |
| 8,014,983 B2 | 9/2011 | Crowe | |
| 10,783,536 B2 | 9/2020 | Chu | |
| 11,556,746 B1* | 1/2023 | Dasgupta | G06F 18/24 |
| 11,569,981 B1* | 1/2023 | Mishra | G06N 3/002 |
| 11,574,242 B1* | 2/2023 | Burke | G06F 3/048 |
| 2012/0116850 A1* | 5/2012 | Abe | G06Q 10/067 |
| | | | 705/7.38 |
| 2013/0179968 A1* | 7/2013 | Ciocarlie | H04L 63/14 |
| | | | 726/22 |

(Continued)

OTHER PUBLICATIONS

Wang et al., "Predicting forced vital capacity (FVC) using support vector regression (SVR)," 2019 Physiological Measurement 40 025101, IPEM Institute of Physics and Engineering in Medicine, 2018, 9 pages.

(Continued)

*Primary Examiner* — Matthew M Kim
*Assistant Examiner* — Matthew N Putaraksa
(74) *Attorney, Agent, or Firm* — Van Leeuwen & Van Leeuwen; Kimberly Zillig (57) ABSTRACT

An approach is provided in which the approach builds a combination model that includes a normal status model and an abnormal status model. The normal status model is built from a set of time-sequenced normal status records and the abnormal status model is built from a set of time-sequenced abnormal status records. The approach computes a set of time-sequenced coefficient combination values of the normal status model and the abnormal status model based on applying a set of fitting coefficient characteristics to the normal status model and the abnormal status model. The approach performs goal seek analysis on a system using the combination model and the set of time-sequenced coefficient combination values.

15 Claims, 9 Drawing Sheets

(56) References Cited

U.S. PATENT DOCUMENTS

| | | | |
|---|---|---|---|
| 2014/0279795 A1* | 9/2014 | Shibuya | G05B 23/0221 |
| | | | 706/46 |
| 2017/0206462 A1* | 7/2017 | Arndt | G06F 11/3433 |
| 2018/0158077 A1 | 6/2018 | Chu | |
| 2018/0158079 A1* | 6/2018 | Chu | G06N 5/022 |
| 2019/0102361 A1* | 4/2019 | Muralidharan | G06F 11/302 |
| 2019/0215328 A1* | 7/2019 | Honig | G06F 16/212 |
| 2020/0117765 A1* | 4/2020 | Sengupta | G06F 30/20 |
| 2020/0257747 A1* | 8/2020 | Efremov | G06F 16/9535 |
| 2020/0380308 A1* | 12/2020 | Boedihardjo | G06N 20/20 |
| 2021/0014102 A1* | 1/2021 | Singh | G06N 3/088 |
| 2021/0042509 A1* | 2/2021 | Valiulla | G06N 20/00 |
| 2021/0089932 A1 | 3/2021 | Han et al. | |
| 2021/0232607 A1* | 7/2021 | Heyrani-Nobari | G06F 16/26 |
| 2021/0330914 A1* | 10/2021 | Young | A61M 16/161 |
| 2022/0131772 A1* | 4/2022 | Itou | G06N 20/00 |
| 2022/0166787 A1* | 5/2022 | Patil | H04L 12/40013 |
| 2022/0207420 A1* | 6/2022 | Sharma | G06V 10/82 |
| 2022/0229903 A1* | 7/2022 | Manevitz | G06F 17/16 |
| 2022/0253746 A1* | 8/2022 | Muller | G06F 18/2193 |
| 2022/0321585 A1* | 10/2022 | Cobb | H04L 63/1425 |
| 2022/0327403 A1* | 10/2022 | Balabine | G06N 5/04 |
| 2022/0327713 A1* | 10/2022 | Maximo | E21B 47/003 |
| 2022/0391300 A1* | 12/2022 | Trapani | H04L 43/08 |
| 2022/0398604 A1* | 12/2022 | Abdul | G06Q 30/0201 |
| 2023/0243790 A1* | 8/2023 | Gioioso | G01N 30/8693 |
| | | | 702/22 |
| 2023/0274152 A1* | 8/2023 | Kovalets | G06N 3/088 |
| | | | 706/15 |
| 2023/0351348 A1* | 11/2023 | Maity | G06Q 20/401 |
| 2023/0359714 A1* | 11/2023 | Cristache | G06F 3/04883 |

OTHER PUBLICATIONS

"Use Goal Seek to find the result you want by adjusting an input value," Microsoft, 2020, 5 pages.

* cited by examiner

FIG. 9 ced coefficient combination values of the normal status model and the abnormal status model based on applying a set of fitting coefficient characteristics to the normal status model and the abnormal status model. The approach performs goal seek analysis on a system using the combination model and the set of time-sequenced coefficient combination values.

GOAL SEEK ANALYSIS BASED ON STATUS MODELS

BACKGROUND

Goal seek analysis is an analysis approach that calculates backwards to determine a set of inputs that results in a given output. Goal seek analysis, also referred to as "what-if" analysis or "back-solving" analysis, is typically attempted through trial and improvement or other logical approaches.

Machine learning algorithms build machine learning models based on training data to make predictions or decisions without being explicitly programmed. The process of training a machine learning model involves providing a machine learning algorithm with the training data from which to learn, and the artifact created from the training process is the machine learning model. The training data includes correct answers that are referred to as targets or target attributes, and the machine learning algorithm finds patterns in the training data that map input data attributes to the target attributes and outputs a machine learning model that captures the patterns.

Machine learning models are typically built to produce an output given a set of inputs. Goal seek analysis is opposite of this approach because the model is looking for a set of inputs given a specific output. In business situations, people are concerned with specific and important status or indexes and, when the status becomes abnormal, users are required to create a valid plan and action to return the status to normal.

BRIEF SUMMARY

According to one embodiment of the present disclosure, an approach is provided in which the approach builds a combination model that includes a normal status model and an abnormal status model. The normal status model is built from a set of time-sequenced normal status records and the abnormal status model is built from a set of time-sequenced abnormal status records. The approach computes a set of time-sequenced coefficient combination values of the normal status model and the abnormal status model based on applying a set of fitting coefficient characteristics to the normal status model and the abnormal status model. The approach performs goal seek analysis on a system using the combination model and the set of time-sequenced coefficient combination values.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
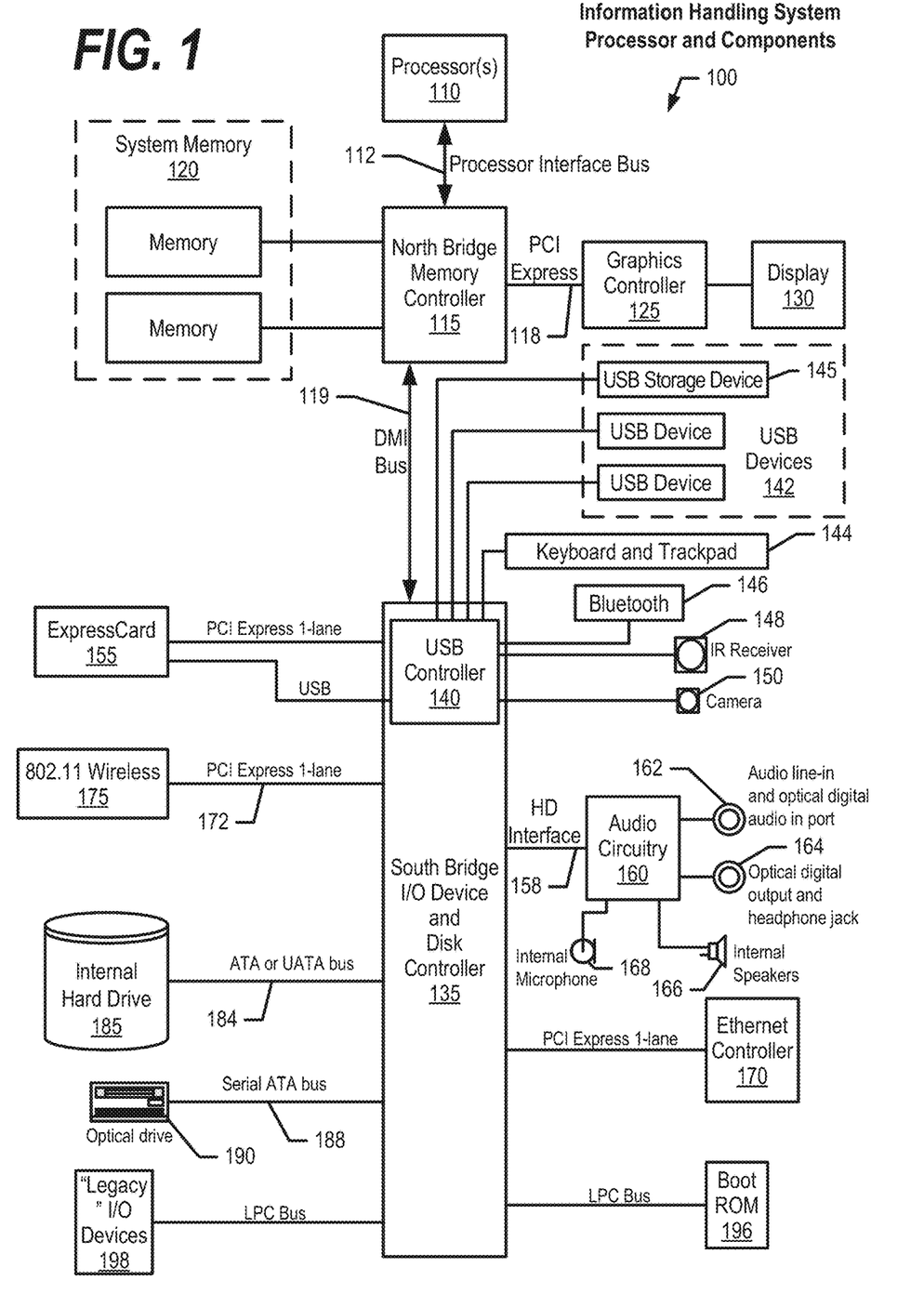
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wirelessly communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
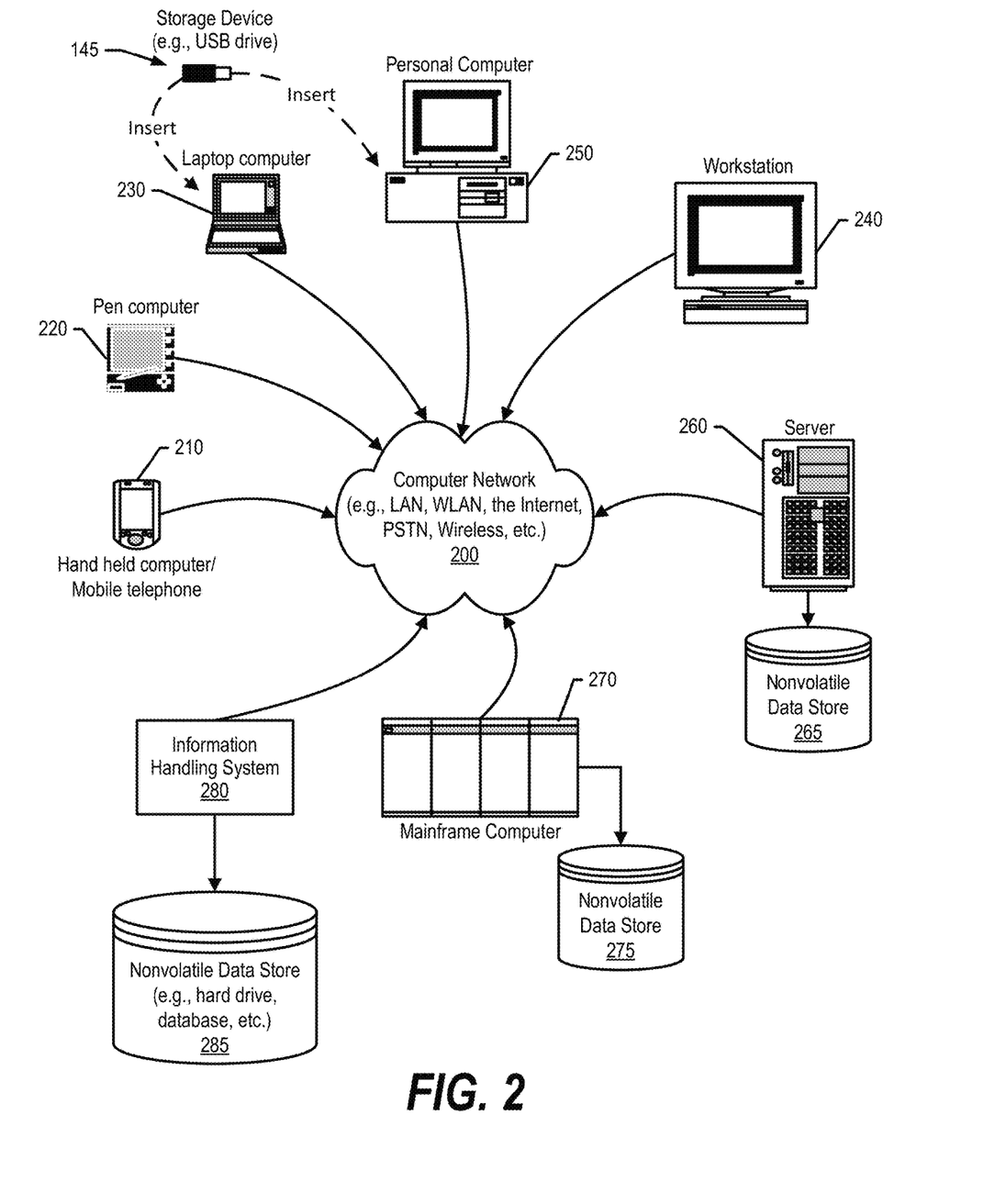
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, machine learning models are built using training data. The training data typically includes "normal status" data records and "abnormal status" data records. The abnormal status data records are also referred to as "outlier" records because their target results are outside a predefined normal range. A challenge found with building a single machine learning model using both normal status data records and abnormal status data records is that the machine learning model accuracy is reduced. For example, the machine learning model accuracy is reduced when a system is in normal status because the machine learning model was partially built from abnormal status records, and the machine learning model accuracy is also reduced when the system is in abnormal status because the machine learning model was partially built from normal status records. Therefore, a challenge exists on how to build and utilize a machine learning model for goal seek analysis that effectively and accurately moves a system from abnormal status to normal status.

FIGS. 3 through 9 depict an approach that can be executed on an information handling system that generates a combination model based on multiple machine learning models and uses the combination model to perform goal seek analysis on a system. The approach builds a reference model using both normal data and abnormal data; builds a normal status model using normal status data; and builds an abnormal status model using abnormal status data. Then, the approach compares the accuracy of the reference model against a combination model that includes the normal status model and the abnormal status model. In turn, when the accuracy of the combination model is better than the reference model, the approach uses the combination model for goal seek analysis.

In one embodiment, the approach combines the normal status model and abnormal status model as a final model with different time-sequenced coefficient combinations in different time intervals, also referred to herein as coefficient combinations. The approach then performs goal seek analysis using the combination model to assist a system return to a normal status by adjusting influential effect values such as the coefficient combinations.

Figure 3:
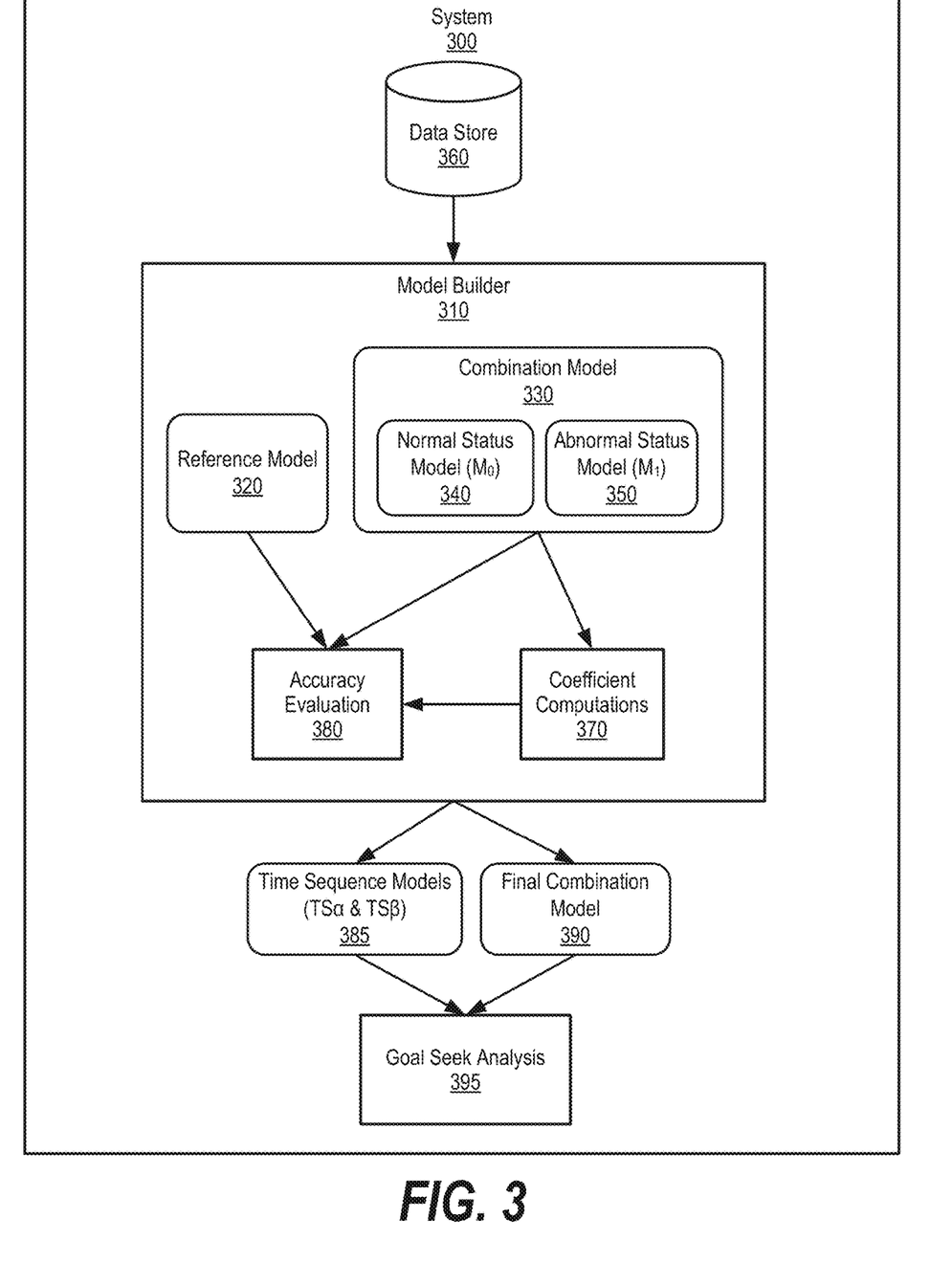
FIG. 3 is an exemplary diagram depicting a system that builds a combination model and uses the combination model for goal seek analysis.
Figure 4:
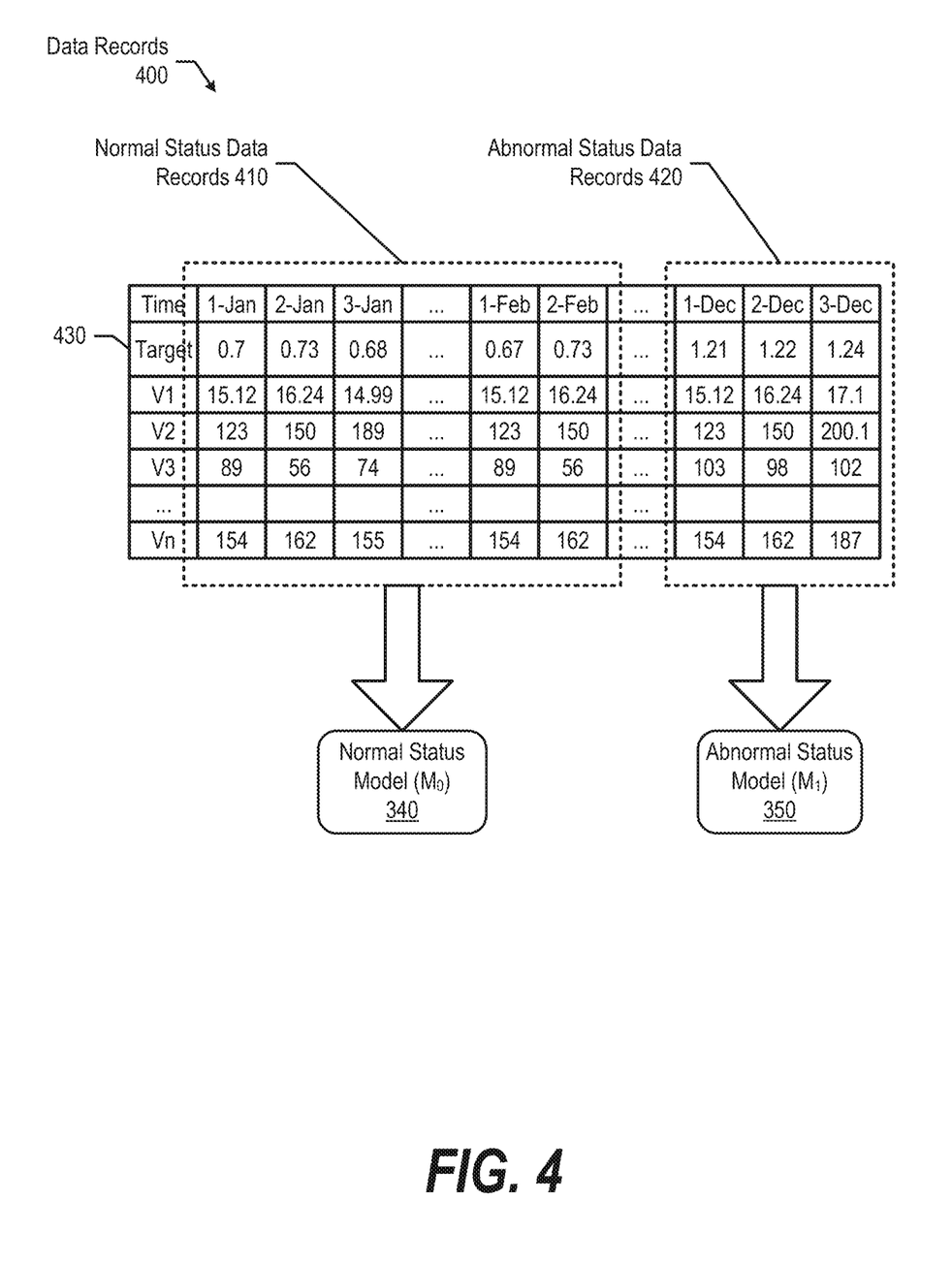
FIG. 4 is an exemplary diagram depicting time-sequenced data records that include normal status data records and abnormal status data records.

FIG. 3 is an exemplary diagram depicting a system that builds a combination model and uses the combination model for goal seek analysis. System 300 includes data store 360, which includes both normal status data records and abnormal status data records. Normal status data records are records that include target values within a predetermined normal range, and abnormal status data records are those records with a target value outside of the predetermined range, also referred to as outliers. FIG. 4 shows an example where the data records with a target value of less than 1.0 are in the normal status category and data records with a target value greater than 1.0 are in the abnormal status category.

Model builder 310 uses both normal status data records and abnormal status data records to build reference model 320. Then, model builder 310 uses the normal status data records to build normal status model 340 and uses the abnormal status data records to build abnormal status model 350. Model builder 310 then combines normal status model 340 with abnormal status model 350 into combination model 330.

Next, model builder 310 performs coefficient computations 370 to create a series of time-sequenced coefficient combinations (α, β) based on predetermined constraints for normal status model 340 and abnormal status model 350. In one embodiment, model builder 310 computes different α and β values for different time intervals and uses different coefficient combinations during goal seek analysis for the combination model at different intervals. Model builder 310 then builds time sequence models for α and β sequences and uses the two time sequence models to provide proper α and β values for future time intervals (see FIG. 6 and corresponding text for further details).

Model builder 310 then performs accuracy evaluation 380, which compares the accuracy of reference model 320 against the accuracy of combination model 330. In one embodiment, model builder 310 uses sample data from data store 360 to determine whether combination model 330 produces more accurate results over reference model 320. When model builder 310 determines combination model 330 is more accurate than reference model 320, indicating that the model structure difference is significant between normal status and abnormal status, model builder 310 produces final combination model 390.

Figure 9:
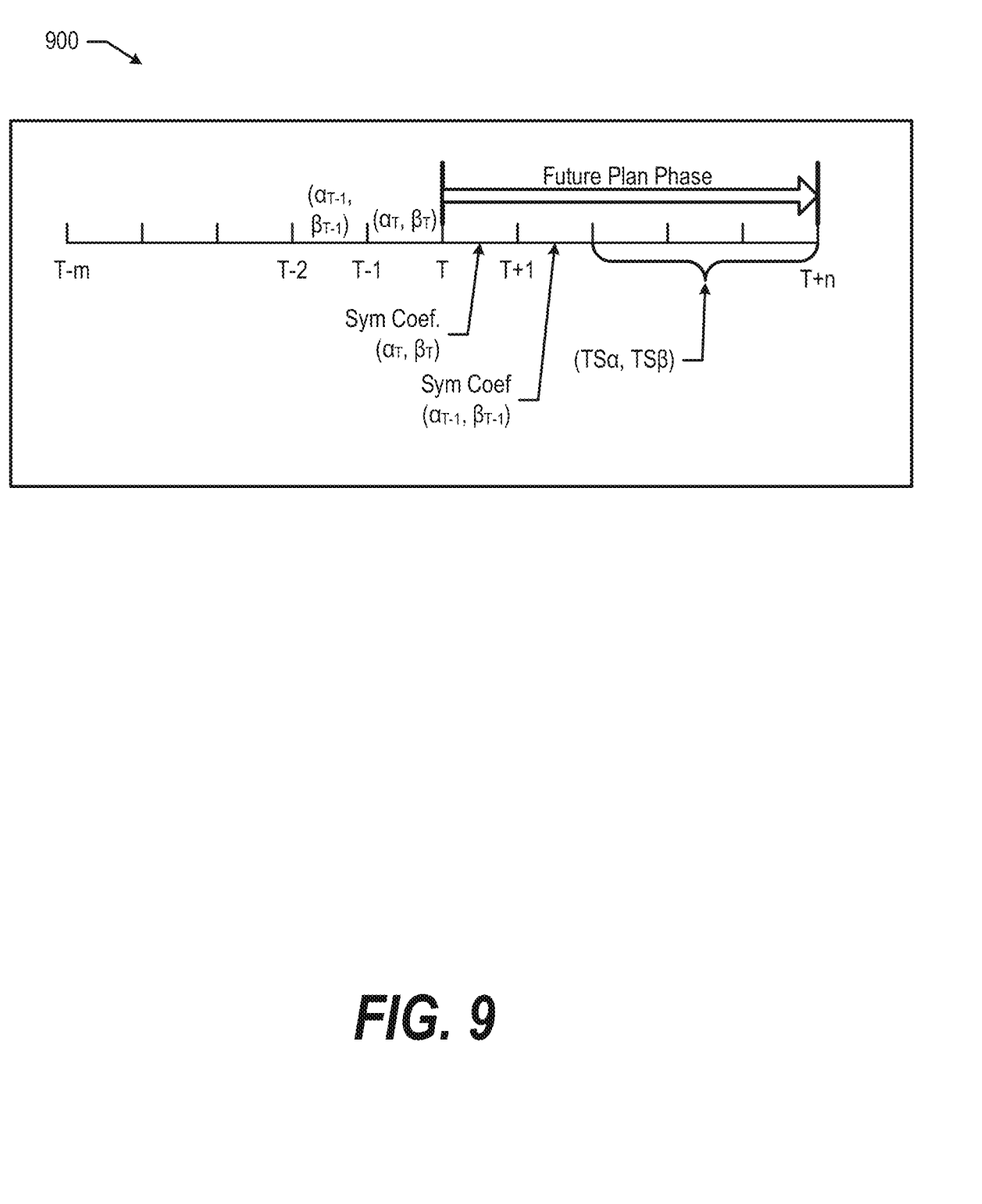
FIG. 9 is an exemplary diagram depicting a graphical representation of selecting time-sequenced coefficient combination values for a combination model to perform goal seek analysis.

In addition, model builder 310 generates time sequence models 385 (TSα and TSβ) based on the coefficient combinations at points in time (αT, αT−1, . . . , αT−m) and (βT, βT−1, . . . , βT−m) that discover coefficient change trend relationships. Then, time sequence models 385 predict the coefficients to use and are applied to final combination model 390 for goal seek analysis 395. In one embodiment, goal seek analysis 395 uses symmetrical interval coefficients, such as using (αT, βT) in interval (T, T+1), using (αT−1, βT−1) in interval (T+1, T+2), and then use coefficients from time sequence models 385 to predict future coefficients. As shown in FIG. 9, the symmetrical interval coefficients are symmetrical based on a time point T. Goal seek analysis 395 may be performed on system 300 or a different system for maintaining a normal status.

In one embodiment, a user may adjust the coefficient combinations of final combination model 390 according to business needs, such as by adjusting a normal status model coefficient to a high value when the user wishes to return to normal at a faster rate.

FIG. 4 is an exemplary diagram depicting time-sequenced data records that include normal status data records and abnormal status data records. Data records 400 are sequenced in time (e.g., 1 January, 2 January, etc.) and include normal status data records 410 and abnormal status data records 420. The example shows that a record is deemed normal or abnormal based on its target value 430 where the record is normal of the target value is less than or equal to 1.00 and abnormal if the target value is above 1.00.

The approach discussed herein uses normal status data records 410 to generate normal status model ($M_0$) 340 and uses abnormal status data records 420 to generate abnormal status model ($M_1$) 350. In one embodiment, model builder 310 uses time sequence techniques to compute the coefficient change trend relationships discussed herein.

Figure 5:
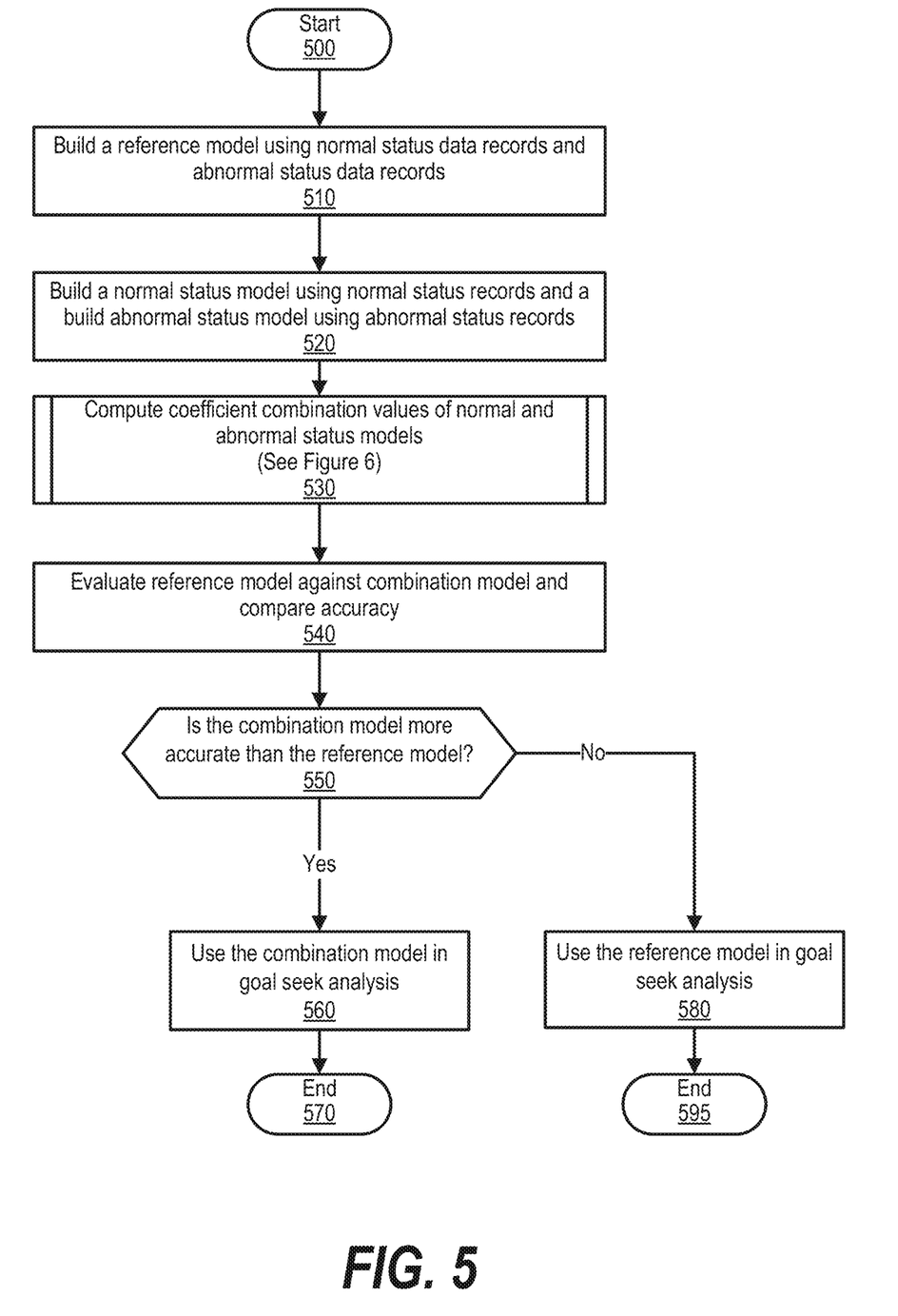
FIG. 5 is an exemplary flowchart depicting steps taking to build a combination model and use the combination model to perform goal seek analysis.

FIG. 5 is an exemplary flowchart depicting steps taking to build a combination model and use the combination model to perform goal seek analysis. FIG. 5 processing commences at 500 whereupon, at step 510, the process builds a reference model using normal status data records and abnormal status data records. Then, at step 520, the process builds two different models that include a normal status model using normal status records and an abnormal status model using abnormal status records.

Figure 6:
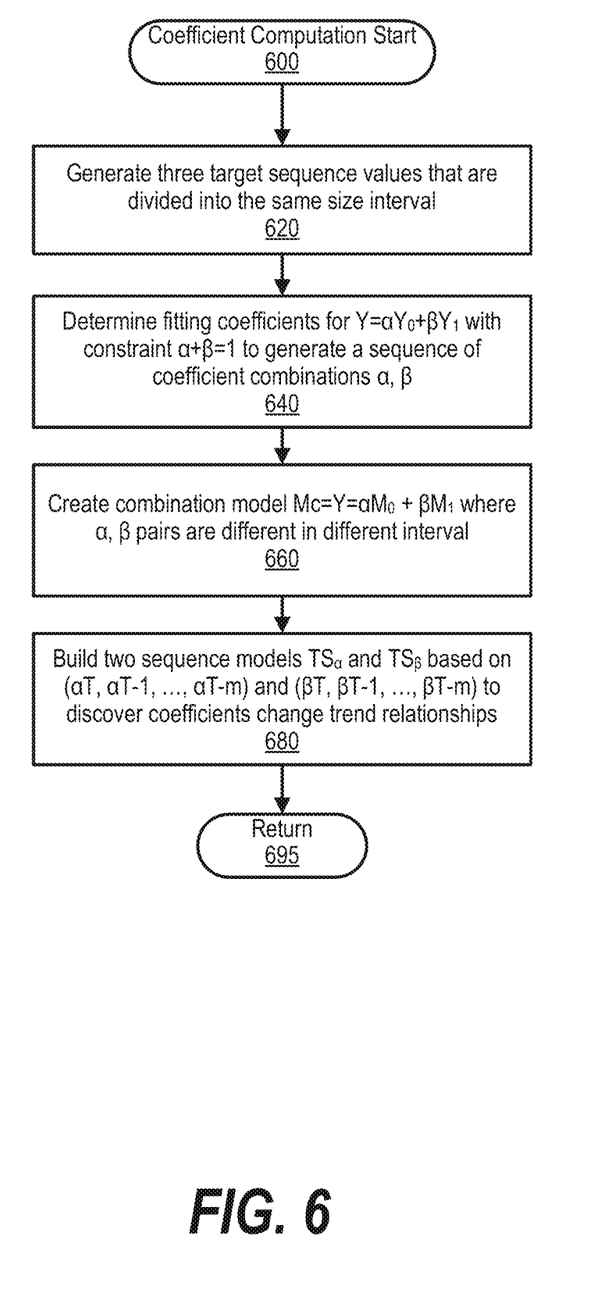
FIG. 6 is an exemplary flowchart depicting steps taken in computing coefficient combination values for a normal status model and an abnormal status model.

At predefined process 530, the process computes time-sequenced coefficient combination values α and β of the normal and abnormal status models, also referred to herein as coefficient combination values (see FIG. 6 and corresponding text for processing details). In one embodiment, the process computes different α and β values for different intervals and uses different time-sequenced coefficient combinations for the combination model at different time intervals. In this embodiment, after determining different α and β values to produce two sequences, the process builds time sequence models for α and β sequences and uses the two models to determine proper α and β values for future time intervals.

At step 540, the process evaluates the reference model against the combination model and compares the accuracy between the reference model and the combination model. In one embodiment, the process uses part of the data in data store 360 as test data and uses the reference model and combination model to score the test data to compute predicted target values separately. In this embodiment, the process then compares the reference model and combination model predicted target values with actual target values to compute two accuracy values and determine which accuracy is better.

The process determines as to whether the combination model has increased accuracy over the reference model (decision 550). If the combination model has increased accuracy over the reference model, then decision 550 branches to the 'yes' branch whereupon, at step 560, the process uses the combination model in future goal seek analysis because the model structure difference is significant between normal status and abnormal status (see FIGS. 7 through 9 and corresponding text for further details). FIG. 5 processing thereafter ends at 570.

On the other hand, if the combination model does not have better accuracy over the reference model, then decision 550 branches to the 'no' branch whereupon, at step 580, the process uses the reference model in future goal seek analysis because there is no significant difference between the reference model and the combination model. FIG. 5 processing thereafter ends at 595.

FIG. 6 is an exemplary flowchart depicting steps taken in computing coefficient combination values for a normal status model (normal status model 340) and an abnormal status model (abnormal status model 350). In one embodiment, as discussed herein, the $\alpha$ and $\beta$ values are different in different time sequence intervals and the process computes different $\alpha$ and $\beta$ values for the different time sequence intervals and uses different coefficient combinations for the combination model at different time intervals (see FIG. 9 and corresponding text for further details).

Figure 8:
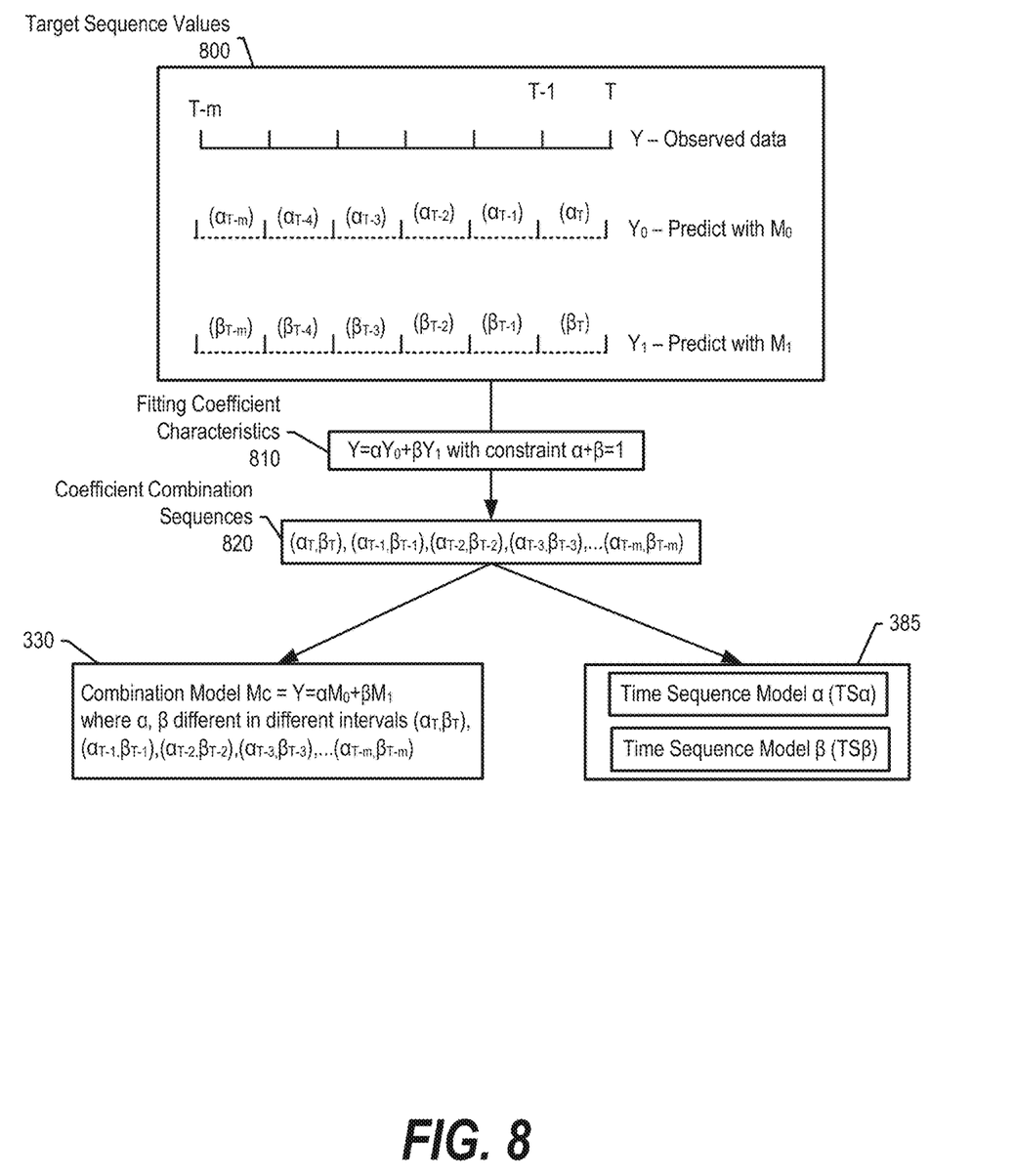
FIG. 8 is an exemplary diagram depicting target sequence values of normal and abnormal status models, coefficient combination sequences based on the target sequence values, and time sequence models based on the coefficient combination sequences.

FIG. 6 processing commences at 600 whereupon, at step 620, the process generates three target sequence values that are divided into the same size interval. FIG. 8 shows target sequence values 800 of Y, Y0, and Y1, where Y includes observed data, Y0 includes data predicted by M0 (normal status model 340), and Y1 includes data predicted by M1 (abnormal status model 350). At step 640, based on a set of fitting coefficient characteristics Y=$\alpha$Y0+$\beta$Y1 and $\alpha$+$\beta$=1, the process determines fitting coefficients for Y=$\alpha$Y0+$\beta$Y1 with a separate constraint of $\alpha$+$\beta$=1 to generate a sequence of time-sequenced coefficient combination values $\alpha$, $\beta$ (coefficient sequence 820 shown in FIG. 8).

At step 660, the process creates a combination model Mc=Y=$\alpha$M0+$\beta$M1 where $\alpha$, $\beta$ pairs are different in different time intervals. At step 680, the process builds two sequence models TS$\alpha$ and TS$\beta$ based on the computed coefficients ($\alpha$T, $\alpha$T-1, ..., $\alpha$T-m) and ($\beta$T, $\beta$T-1, ..., $\beta$T-m) to discover coefficient change trend relationships. Time sequence models 385 are then used during runtime to provide coefficients to apply to final combination model 390 for future predictions (see FIG. 9 and corresponding text for further details). FIG. 6 processing thereafter returns to the calling routine (see FIG. 5) at 695.

Figure 7:
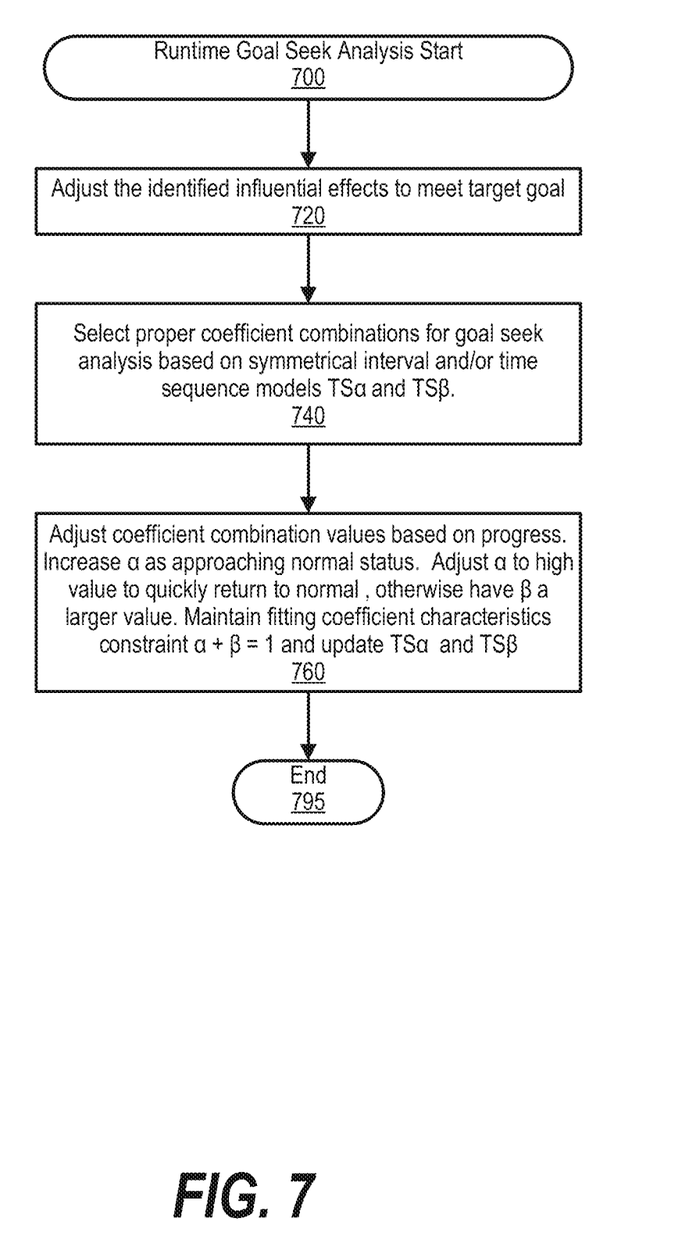
FIG. 7 is an exemplary flowchart showing steps taken in runtime goal seek analysis using a final combination model.

FIG. 7 is an exemplary flowchart showing steps taken in runtime goal seek analysis using a final combination model. FIG. 7 processing commences at 700 whereupon, at step 720, the process adjusts identified influential effects to meet a target goal. In one embodiment, the process uses larger coefficient values in reference model 320 as the influential effects, such as by selecting the top N coefficients after sorting the coefficient values.

At step 740, the process selects proper coefficients for the combination model. In one embodiment, at the beginning of goal seek analysis or a change in a system's status, the process uses symmetrical interval coefficients, such as using ($\alpha$T, $\beta$T) in interval (T, T+1); using ($\alpha$T-1, $\beta$T-1) in interval (T+1, T+2); using symmetrical interval ($\alpha$T-n-1, $\beta$T-n-1) in interval (T+n-1, T+n); and then uses time sequence models 385 to predict future coefficients (see FIG. 9 and corresponding text for further details). In another embodiment, a user may choose to use predicted coefficients with the time sequence model at the beginning of goal seek analysis or a change in a system's status.

At step 760, the process adjusts coefficient combination values based on progress. In one embodiment, the process increases $\alpha$ as the system approaches normal status. The process adjusts $\alpha$ to high value to quickly return to normal status, otherwise the process keeps $\beta$ a larger value. The process maintains the fitting coefficient characteristics constraint $\alpha$+$\beta$=1 and updates TS$\alpha$ and TS$\beta$ as needed. FIG. 7 processing thereafter ends at 795.

FIG. 8 is an exemplary diagram depicting target sequence values of normal and abnormal status models, coefficient combination sequences based on the target sequence values, and time sequence models based on the coefficient combination sequences.

As discussed herein, model builder 310 generates three target sequence values 800 (Y, Y0, Y1) that are divided into same size intervals. In each interval (e.g., (T1, T), (T2, T1), ... (T m 1, T m)), model builder 310 uses fitting coefficient characteristics 810 of Y=$\alpha$Y0+$\beta$Y1 with constraint $\alpha$+$\beta$=1 separately to get a coefficient combination sequences 820. Then, model builder 310 uses coefficient combination sequences 820 to create combination model 330 where Mc=Y=$\alpha$M0+$\beta$M1, and $\alpha$, $\beta$ are different in different intervals ($\alpha$T,$\beta$T), ($\alpha$T-1, $\beta$T-1), ($\alpha$T-2, $\beta$T-2), ($\alpha$T-3, $\beta$T-3), ... ($\alpha$T-m,$\beta$T-m). In turn, model builder 310 creates time sequence models 385 as discussed herein.

FIG. 9 is an exemplary diagram depicting a graphical representation of selecting time-sequenced coefficient combination values for a combination model to perform goal seek analysis.

Graph 900 shows points in time to use particular coefficients with final combination model 390 for goal seek analysis. The approach adjusts the identified influential effects to meet target goal and selects proper coefficients for the combination model based on different time intervals. Graph 900 shows that symmetrical interval coefficients are symmetrical based on a time point T (e.g., a change in status). As such, coefficients ($\alpha$T,$\beta$T) are used in interval (T, T+1), coefficients ($\alpha$T-1, $\beta$T-1) are used in interval (T+1, T+2) and then time sequence models 385 are used to predict coefficients for future time intervals, The coefficients ($\alpha$T, $\beta$T), ($\alpha$T-1, $\beta$T-1), ..., ($\alpha$T-m,$\beta$T-m) are coefficients from intervals (T-1, T), (T-2, T-1) ... (T-m, T-m+1), and the corresponding status is from abnormal to normal.

The two sequence models TS$\alpha$ and TS$\beta$ produce predictions closer to their last point values and, in turn, are closer to normal status analysis. As such, the symmetrical interval coefficients are typically utilized at the beginning of goal seek analysis instead of using coefficients from the time sequence models 385.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A computer-implemented method comprising:
building a combination model comprising a normal status model and an abnormal status model, wherein the normal status model is built from a set of time-sequenced normal status records and the abnormal status model is built from a set of time-sequenced abnormal status records;
computing a set of time-sequenced coefficient combination values of the normal status model and the abnormal status model based on applying a set of fitting coefficient characteristics to the normal status model and the abnormal status model;
detecting a first status change of a system from a normal status to an abnormal status at a first point in time;
selecting a first one of the time-sequenced coefficient combination values from the set of time-sequenced coefficient combination values based on the first status change and the first point in time; and
performing goal seek analysis on the system using the combination model and the first one of the time-sequenced coefficient combination values, wherein the combination model analyzes one or more output state values of the system to determine a set of inputs that return the system from the abnormal status back to the normal status.

2. The method of claim 1 wherein the first one of the time-sequenced coefficient combination values are equivalent to a set of previous time-sequenced coefficient combination values at a time interval prior to the first point in time.

3. The method of claim 1 further comprising:
detecting a second status change of the system from the abnormal status to the normal status at a second point in time;
selecting a second one of the time-sequenced coefficient combination values from the set of time-sequenced coefficient combination values based on the second status change and the second point in time; and
using the second one of the time-sequenced coefficient combination values to perform the goal seek analysis.

4. The method of claim 3 further comprising:
generating a set of target sequence models based on the set of time-sequenced coefficient combination values; and
using the set of target sequence models to predict a third one of the time-sequenced coefficient combination values from the set of time-sequenced coefficient combination values based on a third point in time.

5. The method of claim 1 further comprising:
building a reference model using both the time-sequenced normal status records and the time-sequenced abnormal status records;

comparing an accuracy of the reference model to the combination model; and
utilizing the combination model in the goal seek analysis in response to determining that the combination model is more accurate than the reference model.

6. An information handling system comprising:
one or more processors;
a memory coupled to at least one of the processors;
a set of computer program instructions stored in the memory and executed by at least one of the processors in order to perform actions of:
building a combination model comprising a normal status model and an abnormal status model, wherein the normal status model is built from a set of time-sequenced normal status records and the abnormal status model is built from a set of time-sequenced abnormal status records;
computing a set of time-sequenced coefficient combination values of the normal status model and the abnormal status model based on applying a set of fitting coefficient characteristics to the normal status model and the abnormal status model;
detecting a first status change of a system from a normal status to an abnormal status at a first point in time;
selecting a first one of the time-sequenced coefficient combination values from the set of time-sequenced coefficient combination values based on the first status change and the first
point in time; and
performing goal seek analysis on the system using the combination model and the first one of the time-sequenced coefficient combination values, wherein the combination model analyzes one or more output state values of the system to determine a set of inputs that return the system from the abnormal status back to the normal status.

7. The information handling system of claim 6 wherein the first one of the time-sequenced coefficient combination values are equivalent to a set of previous time-sequenced coefficient combination values at a time interval prior to the first point in time.

8. The information handling system of claim 6 wherein the processors perform additional actions comprising:
detecting a second status change of the system from the abnormal status to the normal status at a second point in time;
selecting a second one of the time-sequenced coefficient combination values from the set of time-sequenced coefficient combination values based on the second status change and the second point in time; and
using the second one of the time-sequenced coefficient combination values to perform the goal seek analysis.

9. The information handling system of claim 8 wherein the processors perform additional actions comprising:
generating a set of target sequence models based on the set of time-sequenced coefficient combination values; and
using the set of target sequence models to predict a third one of the time-sequenced coefficient combination values from the set of time-sequenced coefficient combination values based on a third point in time.

10. The information handling system of claim 6 wherein the processors perform additional actions comprising:
building a reference model using both the time-sequenced normal status records and the time-sequenced abnormal status records;

comparing an accuracy of the reference model to the combination model; and utilizing the combination model in the goal seek analysis in response to determining that the combination model is more accurate than the reference model.

11. A computer program product stored in a computer readable storage medium, comprising computer program code that, when executed by an information handling system, causes the information handling system to perform actions comprising:

building a combination model comprising a normal status model and an abnormal status model, wherein the normal status model is built from a set of time-sequenced normal status records and the abnormal status model is built from a set of time-sequenced abnormal status records;

computing a set of time-sequenced coefficient combination values of the normal status model and the abnormal status model based on applying a set of fitting coefficient characteristics to the normal status model and the abnormal status model;

detecting a first status change of a system from a normal status to an abnormal status at a first point in time;

selecting a first one of the time-sequenced coefficient combination values from the set of time-sequenced coefficient combination values based on the first status change and the first point in time; and performing goal seek analysis on the system using the combination model and the first one of the time-sequenced coefficient combination values, wherein the combination model analyzes one or more output state values of the system to determine a set of inputs that return the system from the abnormal status back to the normal status.

12. The computer program product of claim 11 wherein the first one of the time-sequenced coefficient combination values are equivalent to a set of previous time-sequenced coefficient combination values at a time interval prior to the first point in time.

13. The computer program product of claim 11 wherein the information handling system performs further actions comprising:

detecting a second status change of the system from the abnormal status to the normal status at a second point in time;

selecting a second one of the time-sequenced coefficient combination values from the set of time-sequenced coefficient combination values based on the second status change and the second point in time; and using the second one of the time-sequenced coefficient combination values to perform the goal seek analysis.

14. The computer program product of claim 13 wherein the information handling system performs further actions comprising:

generating a set of target sequence models based on the set of time-sequenced coefficient combination values; and using the set of target sequence models to predict a third one of the time-sequenced coefficient combination values from the set of time-sequenced coefficient combination values based on a third point in time.

15. The computer program product of claim 11 wherein the information handling system performs further actions comprising:

building a reference model using both the time-sequenced normal status records and the time-sequenced abnormal status records;

comparing an accuracy of the reference model to the combination model; and utilizing the combination model in the goal seek analysis in response to determining that the combination model is more accurate than the reference model.

* * * * *